United States Patent
Voglewede et al.

(10) Patent No.: US 8,165,242 B2
(45) Date of Patent: Apr. 24, 2012

(54) SIGNAL JAMMING AVOIDANCE METHOD FOR A FREQUENCY HOPPING COMMUNICATION SYSTEM

(75) Inventors: Paul Edward Voglewede, N. Chili, NY (US); Edwin McCall Leiby, III, Avon, NY (US); Mark Walter Chamberlain, Honeoye Falls, NY (US); Patrick Lang, Pittsford, NY (US); Fred C. Kellerman, Webster, NY (US); Daniel Ernest Stephens, Rochester, NY (US)

(73) Assignee: Harris Corporation, Melbourne, FL (US)

( * ) Notice: Subject to any disclaimer, the term of this patent is extended or adjusted under 35 U.S.C. 154(b) by 80 days.

(21) Appl. No.: 12/824,868

(22) Filed: Jun. 28, 2010

(65) Prior Publication Data

US 2010/0284439 A1   Nov. 11, 2010

Related U.S. Application Data

(62) Division of application No. 11/377,529, filed on Mar. 16, 2006, now Pat. No. 7,782,986.

(51) Int. Cl.
*H04B 7/02* (2006.01)
*H04L 1/02* (2006.01)

(52) U.S. Cl. ........................ 375/267; 375/316

(58) Field of Classification Search .............. 375/132, 375/136, 260, 267, 316, 346, 347
See application file for complete search history.

(56) References Cited

U.S. PATENT DOCUMENTS

| | | | |
|---|---|---|---|
| 6,014,406 A | 1/2000 | Shida et al. | |
| 6,018,543 A * | 1/2000 | Blois et al. | 375/133 |
| 6,052,406 A | 4/2000 | Epstein et al. | |
| 6,078,612 A | 6/2000 | Bertrand et al. | |
| 6,240,126 B1 * | 5/2001 | Ohashi et al. | 375/132 |
| 6,751,249 B1 * | 6/2004 | Cannon et al. | 375/133 |
| 7,469,414 B1 * | 12/2008 | Roeck et al. | 725/111 |
| 2002/0049068 A1 * | 4/2002 | Koo et al. | 455/522 |
| 2003/0156634 A1 * | 8/2003 | Zurbes | 375/227 |
| 2005/0135253 A1 | 6/2005 | Cai et al. | |
| 2007/0173199 A1 | 7/2007 | Sinha | |

* cited by examiner

*Primary Examiner* — Chieh M. Fan
*Assistant Examiner* — Freshteh N Aghdam
(74) *Attorney, Agent, or Firm* — Harness, Dickey & Pierce, PLC

(57) ABSTRACT

To avoid signal jamming, a method is provided for selecting a dwell channel on a receiver in a frequency hopping communication system. The method includes: measuring a noise level on channels over which a data signal is received at the receiver; selecting a dwell channel based on the estimated noise levels, where the dwell channel having the lowest noise level amongst a group of permissible channels over which to acquire a signal from a transmitter; and tuning the receiver to the selected dwell channel during a search state in which the receiver attempts to synchronize with a transmitter.

13 Claims, 3 Drawing Sheets

SIGNAL JAMMING AVOIDANCE METHOD FOR A FREQUENCY HOPPING COMMUNICATION SYSTEM

CROSS-REFERENCE TO RELATED APPLICATIONS

This application is a divisional of U.S. patent application Ser. No. 11/377,529 filed Mar. 16, 2006. The disclosure of the above application is incorporated herein by reference.

FIELD

The present disclosure relates generally to radio communication systems and, more particularly, to a signal jamming avoidance method for a frequency hopping communication system.

BACKGROUND

A frequency hopping communications system utilizes many frequency channels to send information from a transmitter to a receiver. The receiving radio initially tunes to a new reception frequency channel. The new frequency channel is selectable from a group of permissible frequency channels. In many environments, some of these frequency channels can be unusable due to jamming from high noise levels or other interfering signals. To improve the receiver's ability to detect the transmitted signal, it is advantageous to avoid frequency channels that have a poor chance of detecting the desired signal.

Therefore, it is desirable to provide improved signal jamming avoidance methods for frequency hopping communications systems. The statements in this section merely provide background information related to the present disclosure and may not constitute prior art.

SUMMARY

To avoid signal jamming, different methods are provided for selecting a dwell channel on a receiver in a frequency hopping communication system. In one method, the receiver is operable to measure a noise level on channels over which a data signal is received at the receiver; select a dwell channel based on the measured noise levels, where the dwell channel has the lowest noise level amongst a group of permissible channels over which to acquire a signal from a transmitter; and then tune the receiver to the selected dwell channel during a search state in which the receiver attempts to synchronize with a transmitter. A variation of this method may first measure the current noise level on a default channel prior to selecting a channel based on historical measurement data.

In an alternative method, the receiver is operable to estimate a noise level on each channel in a group of permissible channels over which to acquire a synchronization signal from a transmitter during a search state; select a dwell channel having the lowest noise level from amongst the group of permissible channels; and then tune the receiver to the selected dwell channel during the search state.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Frequency hopping is a method of transmitting radio signals by rapidly transmitting a carrier among many frequency channels. Briefly, a transmitter "hops" between available frequencies according to a specified algorithm. The transmitter operates in synchronization with a receiver, which remains tuned to the same frequency as the transmitter. A short burst of data is transmitted on a narrowband. The transmitter then tunes to another frequency and transmits again. Thus, the receiver is capable of hopping its frequency several times a second to correspond to the transmission frequency employed by the transmitter. While the jamming avoidance methods of this disclosure are described in the context of a frequency hopping communication system, they have application to other types of radio communication systems where noise may interfere with a receiver's ability to receive a transmitted signal.

In a frequency hopping communication system, the receiver may operate in three fundamental states: idle, search and active receive. The idle state is an initial state entered by the receiver when it is powered up. During this state, various operating parameters of the receiver are initialized. After initialization, the receiver enters the search state. In the search state, the receiver will attempt to synchronize its operation with the transmitter. To do so, the receiver selects a channel upon which to listen for a synchronizing transmission from the transmitter. At the end of a dwell period, the receiver may choose a new channel upon which to listen. These channels are commonly referred to as the dwell channels. Once a signal is detected by the receiver, the receiver will transition to the active receive state and function in a manner known in the art.

In the search state, the receiver must decide which frequency should be selected as the dwell channel. A list of permissible frequency channels over which to acquire a synchronization signal from a transmitter. In certain applications, the list may change over time. In these instances, reference is made to the receiver's current list.

The Single Channel Ground-Airborne Radio System (SINCGARS) is an example of a radio which employs this type of operation. Further details regarding this radio system may be found in U.S. Pat. Nos. 6,018,543; 6,052,406; and 6,078,612 which are incorporated herein by reference. The jamming avoidance methods of this disclosure are particularly suited for this type of radio system as well as other military application.

Figure 1:
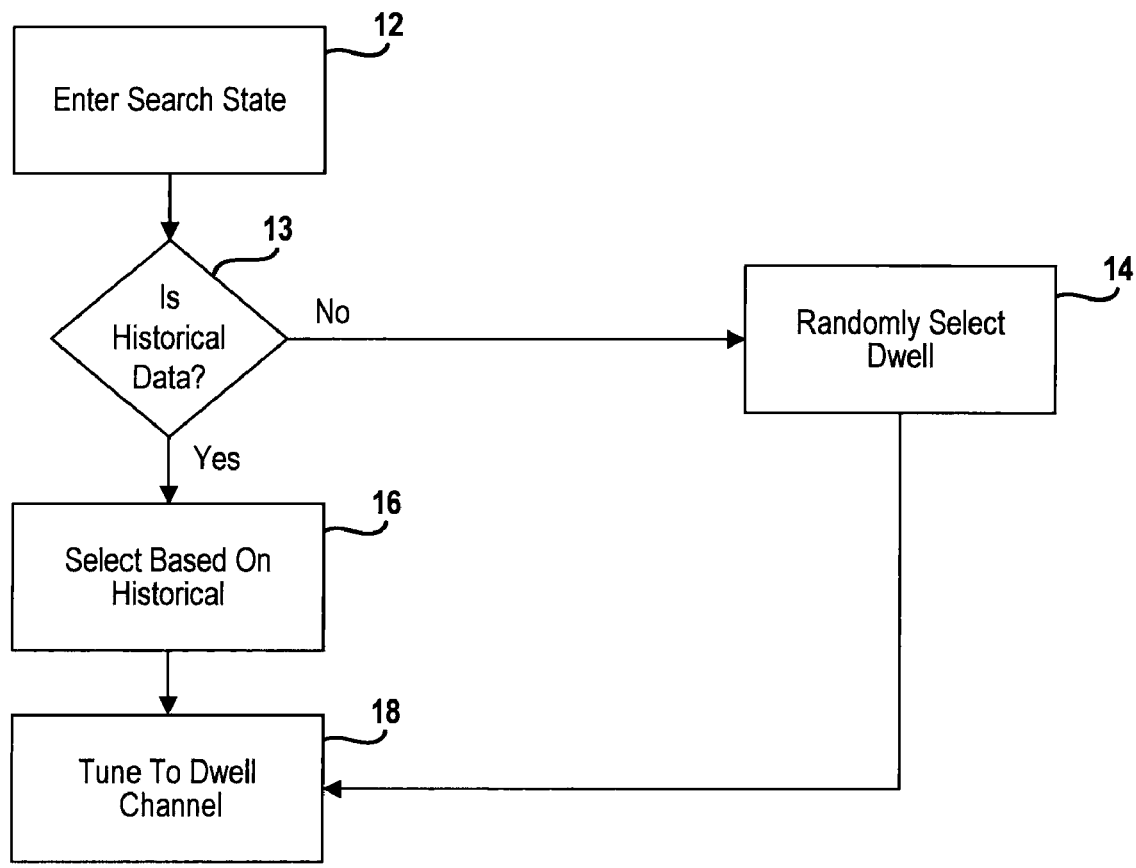
FIG. 1 is a flowchart depicting an exemplary method for selecting the dwell channel of a receiver during its search state.

FIG. 1 depicts an exemplary method for selecting the dwell channel of a receiver during its search state. In this exemplary method, the selection of the dwell channel is based on past data reception. To do so, the receiver may maintain a noise measurement for each of the channels over which a data signal has been received by the receiver. In an active receive state, an incoming radio signal is demodulated by the receiver such that baseband information is produced. While the receiver is tuned on a frequency and actively receiving the radio signal, a measurement of the noise on the channel may be made by the receiver.

For example, the receiver may estimate the signal-to-noise ratio (SNR) of the incoming signal. The estimate of the SNR can be based on the variance of the magnitude samples and/or the statistics of the expected bit transitions. As the variance of the magnitude samples increases, the SNR decreases. As the variance of the expected bit transition increases, the SNR decreases. A SNR estimate for a given frequency may be updated by using a weighted average of the previous SNR estimates. This weighted average can be implemented in a variety of ways. One possible implementation is an exponential averager. An exemplary formula for the exponential averager is $$\text{ave}[n]=(1-\alpha)*\text{ave}[n-1]+\alpha*x[n], \text{ or}$$

$$\text{ave}[n]=\text{ave}[n-1]+\alpha*(x[n]-[n-1]),$$

where $\alpha$ is the time constant, ave[n] is the current average value, and x[n] is the new input value. If the value for $\alpha$ is 1, the current average is updated to the current input value. Thus, no averaging is performed. When $\alpha$ is small (much less then 1), the equivalent uniform averager ($N_{ave}$) is approximately $N_{ave}=2/\alpha$. Other types of noise measurements are also contemplated by this disclosure. At the end of the frequency hop period, the noise measurement for the frequency channel is updated in a data store maintained on the receiver.

In addition, this method may need to disable the SNR estimation if it believes the signal has been lost to a fade or missed end of message. In these cases, the frequency hops will be unjustly classified as a poor channel. For a typical digital squelch tail, this could be a considerable number of frequencies.

Upon entering the search state, the receiver selects a dwell channel. Initially, no historical noise data is available. In this case, the receiver may randomly select a dwell channel as indicated at 14. For the first selection, the probability of signal detection will be one minus the percent of jammed channels. For example, when the jamming level is 40%, the initial probability of detection is 0.6. Before sufficient historical data is available, it is understood that other methods for selecting a dwell channel may be employed.

Once noise data becomes available, the selection is based on this historical data as indicated at 16. More specifically, the channel having the smallest noise measurement is preferably selected as the dwell channel. In an exemplary embodiment, the receiver selects the dwell channel from the list of permissible channels as provided in the current library profile. Alternatively, the receiver may select the dwell channel from a subset of channels in the library profile. For instance, the receiver may compare the SNR values associated with three channel frequencies. From amongst these three channels, the frequency having the highest SNR value (i.e., lowest noise component) is selected as the dwell channel. If a bias to a default channel is desirable, then the SNR values can be scaled appropriately. For example, a scaling factor (e.g., 5 decibels) will be added to the SNR value of the default channel before it is compared to the other channels. For these subsequent selections, the probability will rapidly approach one minus the percent of jammed channels to the number of choices. Thus, the probability of detection approaches a detection rate of 0.936 for a selection amongst three different frequencies.

Following selection of the dwell channel, the receiver tunes to the selected channel at 18 and waits for a synch signal from the transmitter. Upon detecting a synch signal on the dwell channel, the receiver will transition from the search state to an active receive state. Variations to this algorithm are contemplated. For instance, in a heavily jammed environment, the number of permissible frequencies in the list may be increased (e.g., from 3 to 5). The use of additional frequencies could improve the overall probability of acquisition.

Figure 2:
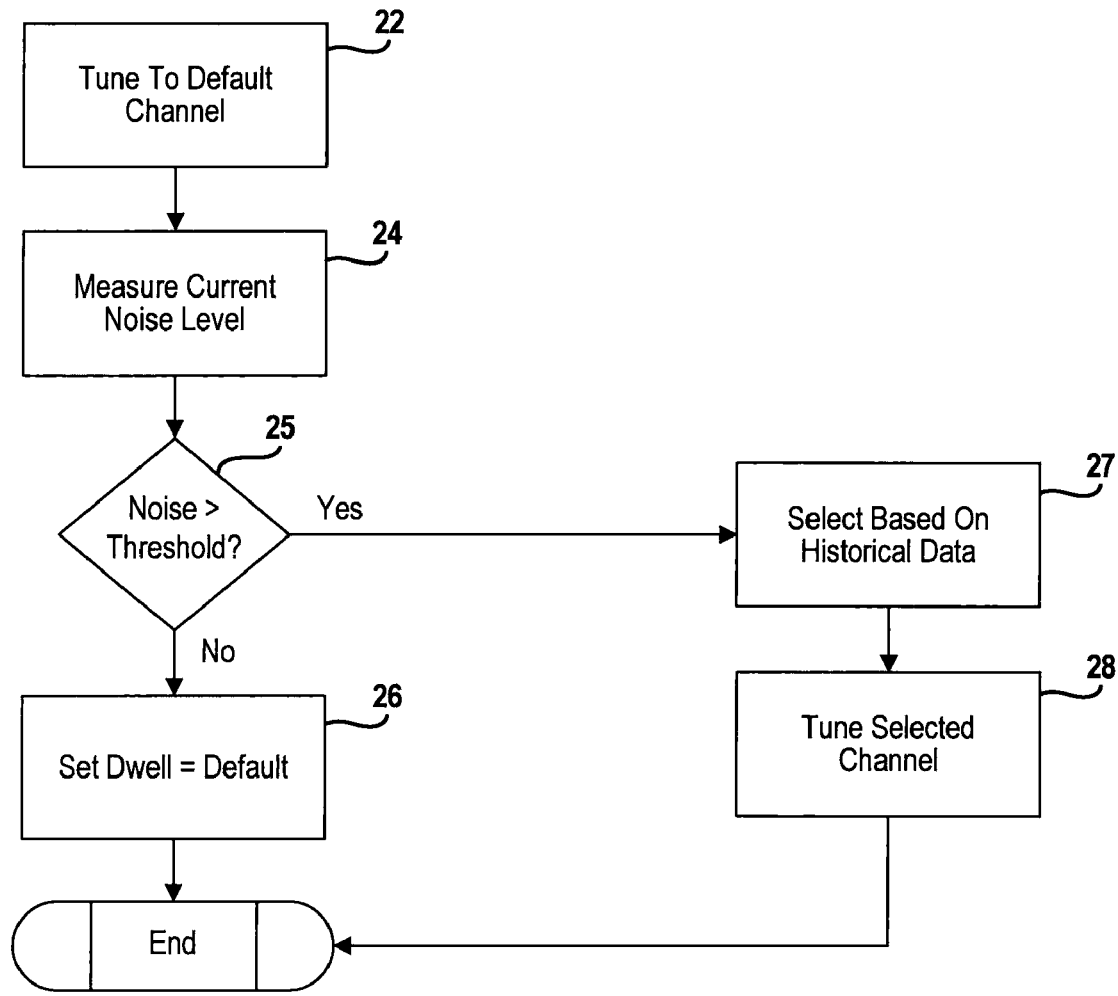
FIG. 2 is a flowchart depicting another exemplary method for selecting the dwell channel of a receiver during its search state.

A variation of this jam avoidance method is further described in relation to FIG. 2. In this alternative approach, the receiver maintains a noise measurement for channels over which a data signal has been received in the manner described above. However, upon entering the search state, the receiver first tunes to a default frequency at 22 and measures the noise level on this default channel at 24. In an exemplary embodiment, the receiver selects the frequency channel associated with the zero time offset in the library profile. When the noise level on the default frequency is less than some empirically derived threshold, this frequency is selected at 26 as the dwell channel by the receiver. In one exemplary embodiment, the threshold is set to a median or average noise measurement from the previous dwell periods.

The noise level can be measured by using an exponential or block averager on the received samples and the receiver gain attenuation. For illustration purposes, assume the received signal can be averaged over 256 samples. Using $N_{ave}=2/\alpha$, the $\alpha$ value for the exponential smoother is 0.00718 or $\frac{1}{128}$. This can be implemented as a shift of 7 in an exponential smoother. A block averager can sum the samples and shift the result by 8 bits.

During noise estimation, the signal detection function of the receiver may be disabled. This is done to simplify the race condition of receiving signal detection and then switching frequency. However, the potential to miss a transmitted signal does exist. To improve performance, the signal detection function may remain enabled during noise estimation.

When the noise level is greater than or equal to the threshold, the receiver selects the dwell channel at 27 based on historical noise measures. For instance, the receiver selects the channel having the smallest noise measurement in the manner described above. In other words, the receiver may select the dwell channel from the list of permissible channels or a subset thereof. Following selection of the dwell channel, the receiver tunes to the selected channel at 28 and waits for a synch signal from the transmitter. This variation adds some dynamic characteristics to the first jam avoidance method, but still relies upon historical noise data which may not reflect the current conditions.

Figure 3:
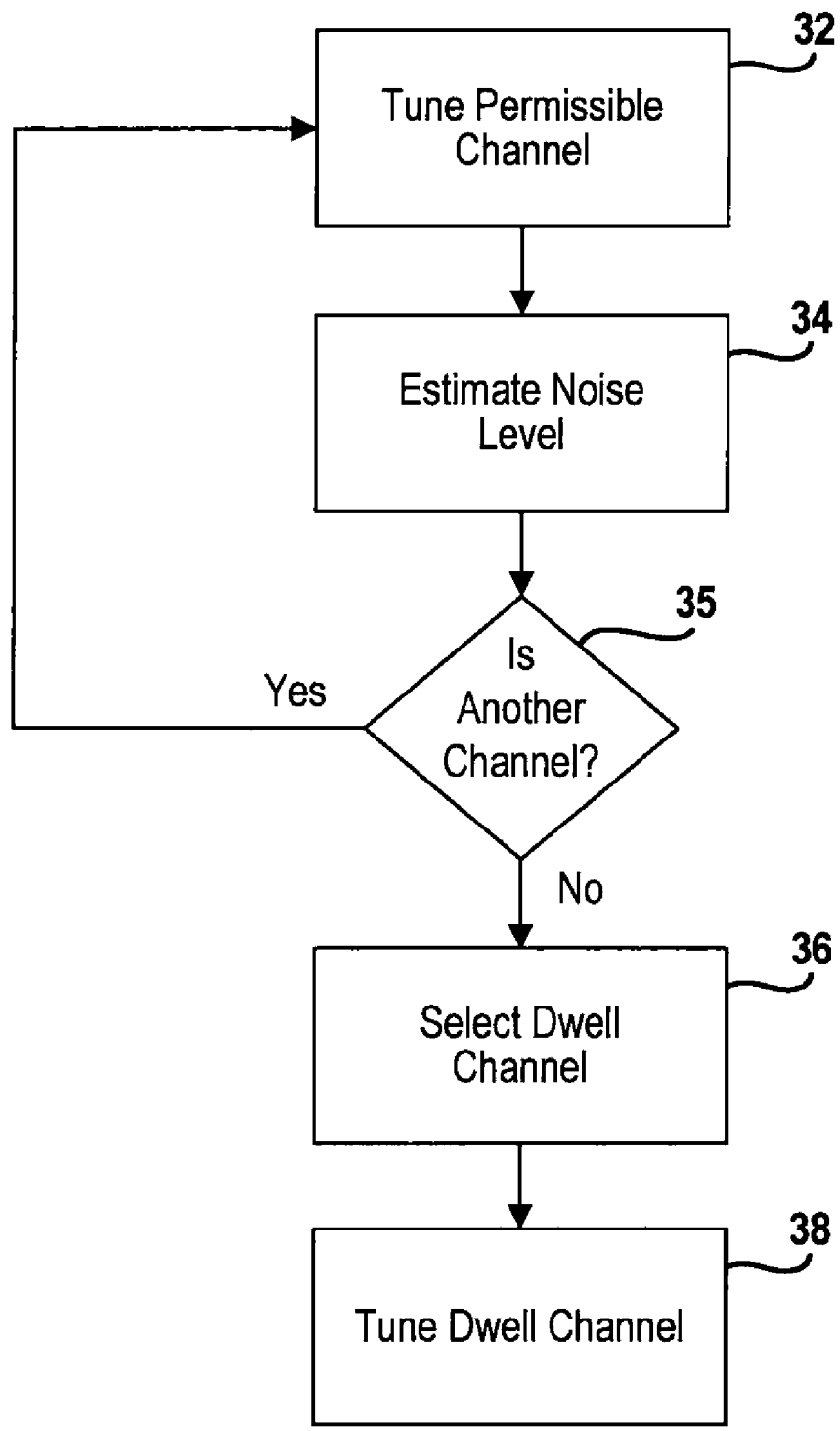
FIG. 3 is a flowchart depicting yet another exemplary method for selecting the dwell channel of a receiver during its search state.

FIG. 3 illustrates another exemplary method for selecting the dwell channel of a receiver during its search state. In this approach, the selection of the dwell channel is based on a noise estimate for each channel in a group of permissible channels. Again, the group of permissible channels may correlate to the frequencies provided by the current library profile or a subset thereof. Upon entering the search state, the receiver begins by tuning to one of the channels in the group of permissible channels. The receiver then estimates the noise level on this channel in the same manner as described above. Upon completing the noise measure, the receiver tunes to another channel in the group and estimates the noise level on this channel. This process is repeated for each of the channels in the group of permissible channels.

The noise estimations for each channel are compared and the frequency having the lowest noise level is chosen as the dwell channel. It may be advantageous to bias the selection by adjusting the noise estimate for a specific channel. The bias can be implemented by subtracting off a power of 2 divisor from the estimated noise value (i.e., NoiseF0= (NoiseF0>>2)). Other schemes for biasing the noise estimates are also contemplated by this disclosure. Lastly, the receiver tunes to the selected dwell channel and listens for a synch signal.

Variations to this method can be implemented to minimize the deaf period. Rather than using current noise estimates, variations may employ historical noise data in some instances. For example, when the list of permissible frequencies changes over time, a noise estimate for given frequency may be carried forward for use in an immediately subsequent determination regarding the same frequency. In contrast, if the given frequency does not occur in a subsequent occurring list, then the determination will revert to a current noise estimate on the channel. Similar variations will be readily apparent to one skilled in the art. Other improvements could include increases to the number of permissible frequencies upon which to test for noise. The more frequencies to choose from in a jammed environment, the higher the probability of detection. However, in a good signal environment, an increase in the number of frequencies will decrease the probability of detection. This may force the issue of searching for signal presence while measuring the noise level.

The above description is merely exemplary in nature and is not intended to limit the present disclosure, application, or uses.

What is claimed is:

1. A method of selecting a dwell channel on a receiver in a frequency hopping communication system, the receiver being operable in at least a search state and an active receive state, comprising:
   measuring a noise level on each channel in a group of two or more channels over which a data signal is received from a transmitter at the receiver during an active receive state;
   maintaining at the receiver the measured noise levels for each channel in the group of channels;
   selecting, during a search state, a dwell channel for the receiver from the group of channels using the measured noise levels, the dwell channel having the lowest noise level amongst the group of two or more channels; and
   tuning the receiver to the selected dwell channel during the search state in which the receiver attempts to synchronize with the transmitter.

2. The method of claim 1 wherein measuring a noise level further comprises determining a signal-to-noise ratio for each channel over which a data signal has been received at the receiver during the active receive state.

3. The method of claim 1 wherein selecting a dwell channel occurs upon the receiver entering a search state.

4. The method of claim 1 further comprises randomly selecting a dwell channel from amongst the group of two or more channels when measured noise levels are not available for the group of two or more channels.

5. The method of claim 1 further comprises:
   tuning the receiver to a default channel upon entering a search state, the default channel selected from amongst the group of two or more channels;
   measuring a current noise level on the default channel; and
   selecting the default channel as the dwell channel when the current noise level on the default channel is less than a threshold noise level.

6. The method of claim 5 further comprises selecting a dwell channel from amongst the group of two or more channels when the current noise level on the default channel is greater than or equal to the threshold noise level.

7. The method of claim 1 further comprises transitioning operation of the receiver from the search state to the active receive state upon detecting a synch signal on the dwell channel form the transmitter.

8. A method of selecting a dwell channel for use during a search state by a receiver device in a frequency hopping communication system, comprising:
   measuring a noise level on each of the channels in a group of two or more channels, where the measurement is taken by the received device while a data signal is received on a given channel;
   maintaining in a data store at the receiver device the measured noise levels for each channel in the group of channels;
   selecting, during a search state, a dwell channel for the receiver device from the group of channels using the measured noise levels, the dwell channel having the lowest noise level amongst the group of two or more channels; and
   tuning the receiver device to the selected dwell channel during the search state; and
   synchronizing communication with a transmitter device upon receiving a synchronization transmission on the dwell channel from the transmitter device.

9. The method of claim 8 wherein measuring a noise level further comprises determining a signal-to-noise ratio for each channel over which a data signal has been received at the receiver during the active receive state.

10. The method of claim 8 wherein selecting a dwell channel occurs upon the receiver entering a search state.

11. The method of claim 8 further comprises randomly selecting a dwell channel from amongst the group of two or more channels when measured noise levels are not available for the group of two or more channels.

12. The method of claim 8 further comprises:
   tuning the receiver to a default channel upon entering a search state, the default channel selected from amongst the group of two or more channels;
   measuring a current noise level on the default channel; and
   selecting the default channel as the dwell channel when the current noise level on the default channel is less than a threshold noise level.

13. The method of claim 12 further comprises selecting a dwell channel from amongst the group of two or more channels when the current noise level on the default channel is greater than or equal to the threshold noise level.

* * * * *